Patented Oct. 2, 1934

1,975,383

UNITED STATES PATENT OFFICE 1,975,383

2 - (3' - HYDROXYNAPHTHYL - 2') - 4 - HYDROXY - 6,7 - BENZO - PSEUDOAZIMINOBENZENES

Arthur Zitscher, Offenbach-on-the-Main, Germany, assignor to General Aniline Works, Inc., New York, N. Y., a corporation of Delaware No Drawing. Application January 31, 1933, Serial No. 654,552. In Germany February 9, 1932

4 Claims. (Cl. 260—44)

The present invention relates to 2-(3'-hydroxynaphthyl - 2') - 4 - hydroxy - 6,7 - benzo - pseudoaziminobenzenes; more particularly it relates to compounds of the following general formula:

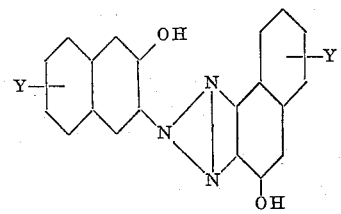

wherein Y stands for hydrogen, halogen or an alkoxy group.

I have found that the hitherto unknown 2-(3'- hydroxynaphthyl-2') - 4-hydroxy-6,7-benzo-pseudoaziminobenzenes of the following formula:

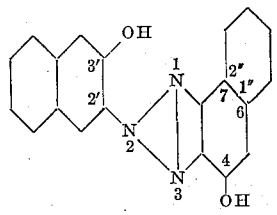

which may also be substituted in the benzene nuclei which do not contain the hydroxy groups, are obtainable by coupling the diazo-compound of a 2-amino-3-hydroxynaphthalene, the hydrogen atom of the hydroxy group of which being replaced by a suitable radical as, for instance, by acyl or alkyl radicals, with a 2-amino-3-hydroxynaphthalene, the hydrogen atom of the hydroxy group of which being likewise replaced by a suitable radical, converting the ortho-aminoazo-dyestuff, thus formed, to the pseudo-azimine according to known methods and splitting off the radicals linked to the hydroxy groups.

The 2-(3'-hydroxy-naphthyl-2')-4-hydroxy-6,7-benzo-pseudoaziminobenzenes are valuable intermediates for the preparation of dyestuffs. They are of especially technical value for the reason that they possess a considerably enhanced affinity for the vegetable fiber when compared with 2-hydroxynaphthalene.

The following examples serve to illustrate the invention but they are not intended to limit it thereto:

(1) A paste is prepared from 94 grams of 2-amino - 3 -(4'- methylbenzenesulfonyl-hydroxy)-naphthalene, finely dispersed, and 120 cc. of hydrochloric acid of specific gravity 1.16, the whole is cooled to 0° C. by means of ice and water and diazotized by addition of an aqueous solution of 21 grams of sodium nitrite. The whole is filtered and the clear yellow diazo-solution obtained is combined with a solution of 94 grams of 2 - amino - 3 -(4'- methylbenzenesulfonyl-hydroxy)-naphthalene in dilute acetic acid. After neutralization of the mineral acid by means of sodium acetate and filtration, 2-amino-3,3'-di-(4''- methylbenzenesulfonyl - hydroxy)-1,2'-azo-naphthalene is obtained which crystallizes from glacial acetic acid in the form of red brilliant needles, melting at 198° C. to 199° C. (uncorrected). The yield amounts to 84% of the theoretical.

75 grams of thionylchloride are added to 155 grams of the dried azo-dyestuff, above-described, in 1000 cc. of xylene; the whole is heated to boiling until the evolution of $SO_2$ and HCl has ceased. The xylene is distilled off by means of steam, the reaction mixture is filtered by suction and the part remaining on the filter is washed out. The product which is still wet, is then brought into 1500 cc. of alcohol and, after addition of 200 cc. of caustic soda solution of 36° Bé. (30% strength), the whole is heated in a reflux apparatus for two hours. The alcohol is removed by distillation and the remaining solution is diluted with water, freed by filtration from any undissolved substances and the 2-(3'-hydroxynaphthyl - 2')-4-hydroxy-6,7-benzo-pseudoaziminobenzene is precipitated by means of acids in the form of a grayish-white precipitate. The compound crystallizes from xylene in the form of colorless brilliant needles, melting at 282° C. to 283° C. (uncorrected). It corresponds to the folowing formula:

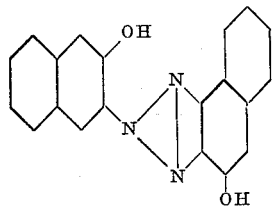

The yield amounts to 75% of the theoretical, calculated upon the azo-dyestuff.

(2) 34.6 grams of 2-amino-3-methoxy-naphthalene are dissolved in 200 cc. of water and 20 cc. of hydrochloric acid of specific gravity 1.16, while adding 250 cc. of glacial acetic acid; then 30 cc. of hydrochloric acid of specific gravity 1.16 are added, while stirring.

At 10° C. to 20° C., 50 cc. of a 2n-sodium-nitrite-solution are run thereto during 10 minutes and the whole is stirred until the dyestuff formation is finished.

After filtration, a paste is prepared from the dyestuff paste and aqueous ammonia, it is feebly warmed, filtered again, washed out and dried. The 2-amino-3.3'-dimethoxy-1.2'-azonaphthalene crystallizes from xylene in the form of light-red leaflets, melting at 196° C. (uncorrected).

35.7 grams of 2-amino-3,3'-dimethoxy-1,2'-azonaphthalene are dissolved in 100 cc. of pyridine. A solution of 30 grams of crystallized copper sulfate in 75 cc. of water and 75 cc. of pyridine is run thereto and the whole is heated to boiling while passing a moderate air current through the solution until a test portion dissolves in glacial acetic acid to a feebly yellow solution with a bluish-green fluorescence. After filtration, the pyridine is blown off by means of steam, the whole is filtered and the residue remaining on the filter is heated to boiling for about 3 hours in a reflux apparatus within a mixture of 100 cc. of glacial acetic acid and 100 cc. of hydrobromic acid (21% by volume). The solution is then poured into water, rendered alkaline by means of dilute caustic soda solution and filtered; the 2-(3'-hydroxynaphthyl-2')-4-hydroxy-6,7-benzo-pseudoaziminobenzene is precipitated from the alkaline filtrate by means of carbon dioxide.

By using other starting materials, the hydrogen atom of the hydroxy group of which being replaced, for instance, by the radical of 3-sulfobenzoic acid, the acyl radicals may also be split off in an aqueous alkaline solution. By starting from parent materials which have different substituents in the benzene nuclei not containing the hydroxy group, unsymmetrically substituted compounds are thus obtained.

In a manner similar to that described above, there are obtained, for instance:

2 - (3' - hydroxy - 7'-bromonaphthyl-2')-4-hydroxy-bz-4''- bromo - 6.7 - benzo-pseudoazimino-benzene (forming an indistinctly crystalline powder when recrystallized from glacial acetic acid and melting above 320° C.), 2 - (3'-hydroxy-7'-methoxynaphthyl-2')-4-hydroxy-bz-4''-methoxy-6.7-benzo-pseudiazominobenzene (forming an indistinctly crystalline powder when recrystallized from chlorobenzene and melting at 265° C. to 267° C., uncorrected) and 2 - (3'-hydroxynaphthyl-2')-4-hydroxy-bz-4''-bromo-6.7-benzo-pseudoaziminobenzene (forming an indistinctly crystalline powder when recrystallized from dichlorobenzene and melting at 296° C. to 297° C., uncorrected).

I claim:
1. The compounds of the following general formula:

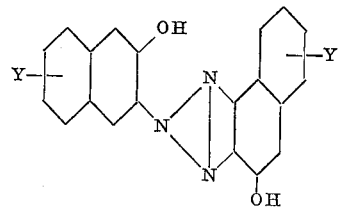

wherein Y stands for hydrogen, halogen or an alkoxy group, representing crystallized compounds which are valuable intermediates for the production of dyestuffs.

2. The compounds of the following general formula:

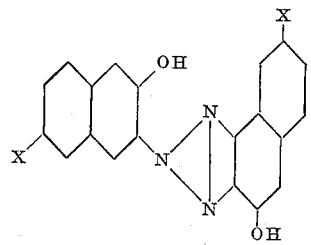

wherein X stands for hydrogen, bromine or a methoxy group, representing crystallized compounds which are valuable intermediates for the production of dyestuffs.

3. The compound of the following formula:

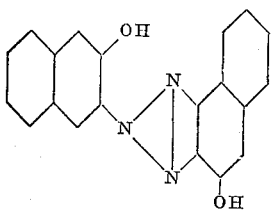

crystallizing from xylene in the form of colorless brilliant needles, melting at 282° C. to 283° C.

4. The compound of the following formula:

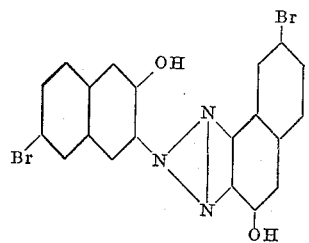

forming an indistinctly crystalline powder when recrystallized from glacial acetic acid and melting above 320° C.

ARTHUR ZITSCHER.